United States Patent
Lutas et al.

(10) Patent No.: US 9,672,354 B2
(45) Date of Patent: *Jun. 6, 2017

(54) SYSTEMS AND METHODS FOR EXPOSING A RESULT OF A CURRENT PROCESSOR INSTRUCTION UPON EXITING A VIRTUAL MACHINE

(71) Applicant: Bitdefender IPR Management Ltd., Nicosia (CY)

(72) Inventors: Andrei V. Lutas, Satu Mare (RO); Sandor Lukacs, Floresti (RO)

(73) Assignee: Bitdefender IPR Management Ltd., Nicosia (CY)

( * ) Notice: Subject to any disclaimer, the term of this patent is extended or adjusted under 35 U.S.C. 154(b) by 20 days.

This patent is subject to a terminal disclaimer.

(21) Appl. No.: 14/489,820

(22) Filed: Sep. 18, 2014

(65) Prior Publication Data

US 2016/0048680 A1 Feb. 18, 2016

Related U.S. Application Data

(60) Provisional application No. 62/038,476, filed on Aug. 18, 2014.

(51) Int. Cl.
*G06F 21/00* (2013.01)
*G06F 21/55* (2013.01)
(Continued)

(52) U.S. Cl.
CPC ........ *G06F 21/554* (2013.01); *G06F 9/45558* (2013.01); *G06F 12/08* (2013.01); *G06F 12/109* (2013.01); *G06F 12/1027* (2013.01); *G06F 12/1475* (2013.01); *G06F 21/53* (2013.01); *G06F 21/56* (2013.01); *H04L 63/145* (2013.01); *G06F 2009/45587* (2013.01); *G06F 2221/033* (2013.01)

(58) Field of Classification Search
CPC .... G06F 21/56; G06F 9/4558; G06F 9/45587; G06F 9/45533
USPC .......................................................... 726/23
See application file for complete search history.

(56) References Cited

U.S. PATENT DOCUMENTS 5,926,646 A 7/1999 Pickett et al.
6,625,725 B1 9/2003 Wu et al.
(Continued)

OTHER PUBLICATIONS

Lutas, U.S. Appl. No. 14/489,801, filed Sep. 18, 2014.
(Continued)

*Primary Examiner* — Syed Zaidi
(74) *Attorney, Agent, or Firm* — Law Office of Andrei D Popovici, PC (57) ABSTRACT

Described systems and methods enable a host system to efficiently perform computer security activities, when operating in a hardware virtualization configuration. A processor is configured to generate a VM suspend event (e.g., a VM exit or a virtualization exception) when a guest instruction executing within a guest VM performs a memory access violation. In some embodiments, the processor is further configured to delay generating the VM suspend event until the execution stage of the pipeline for the guest instruction is complete, and to save results of the execution stage to a specific location (e.g. a specific processor register readable by security software) before generating the event.

20 Claims, 8 Drawing Sheets

(51) Int. Cl.
*G06F 21/56* (2013.01)
*G06F 21/53* (2013.01)
*G06F 9/455* (2006.01)
*H04L 29/06* (2006.01)
*G06F 12/08* (2016.01)
*G06F 12/1027* (2016.01)
*G06F 12/109* (2016.01)
*G06F 12/14* (2006.01)

(56) References Cited

U.S. PATENT DOCUMENTS

| | | | |
|---|---|---|---|
| 7,634,642 B2 | 12/2009 | Hochschild et al. | |
| 7,856,547 B1 | 12/2010 | Koryakin et al. | |
| 7,937,700 B1 | 5/2011 | Klaiber et al. | |
| 7,996,836 B1 | 8/2011 | McCorkendale et al. | |
| 8,261,028 B2 | 9/2012 | Yoon et al. | |
| 8,464,028 B2 | 6/2013 | Serebrin et al. | |
| 8,612,975 B2 | 12/2013 | Serebrin et al. | |
| 8,713,631 B1 | 4/2014 | Pavlyushchik | |
| 9,069,586 B2 | 6/2015 | Dang et al. | |
| 9,165,136 B1 | 10/2015 | VanLund | |
| 2004/0111568 A1* | 6/2004 | Nguyen | G06F 9/3824 711/154 |
| 2005/0283586 A1 | 12/2005 | Mondal et al. | |
| 2006/0015869 A1 | 1/2006 | Neiger et al. | |
| 2007/0106986 A1 | 5/2007 | Worley, Jr. | |
| 2007/0136724 A1 | 6/2007 | Sharma et al. | |
| 2008/0148048 A1 | 6/2008 | Govil et al. | |
| 2008/0271014 A1 | 10/2008 | Serebrin et al. | |
| 2010/0318991 A1* | 12/2010 | Venkitachalam | G06F 9/45533 718/1 |
| 2011/0131388 A1 | 6/2011 | Chen et al. | |
| 2013/0007325 A1 | 1/2013 | Sahita et al. | |
| 2013/0086299 A1* | 4/2013 | Epstein | G06F 12/1475 711/6 |
| 2013/0091318 A1 | 4/2013 | Bhattacharjee et al. | |
| 2013/0174144 A1 | 7/2013 | Cheng et al. | |
| 2013/0283370 A1 | 10/2013 | Vipat et al. | |
| 2013/0339673 A1 | 12/2013 | Belmar et al. | |
| 2013/0339704 A1 | 12/2013 | Greiner et al. | |
| 2013/0339796 A1 | 12/2013 | Greiner et al. | |
| 2013/0339963 A1 | 12/2013 | Greiner et al. | |
| 2014/0164746 A1* | 6/2014 | Greiner | G06F 9/30043 712/226 |
| 2015/0199507 A1 | 7/2015 | Azab et al. | |
| 2015/0199532 A1 | 7/2015 | Ismael et al. | |

OTHER PUBLICATIONS

USPTO, Office Action mailed Jan. 5, 2016 for U.S. Appl. No. 14/489,801, filed Sep. 18, 2014.

European Patent Office, International Search Report and Written Opinion Mailed Sep. 13, 2016 for PCT International Application No. PCT/RO2015/050008, international filing date Aug. 11, 2015, priority date Aug. 18, 2014.

Pfoh et al.,"Exploiting the x86 Architecture to Derive Virtual Machine State Information", 2010 Fourth International Conference on Emerging Security Information, Systems and Technologies, p. 166-175, IEEE, Piscataway, NJ, USA, Jul. 2010.

CIS-77, "Encoding Real x86 Instructions", retrieved from the internet: URL:https://web.archive.org/web/20160409042736/http://www.c-jump.com/CIS77/CPU/x86/lecture.html, Dec. 27, 2012.

European Patent Office, International Search Report and Written Opinion Mailed Sep. 28, 2016 for PCT International Application No. PCT/RO2015/050009, international filing date Aug. 11, 2015, priority date Aug. 18, 2014.

Intel Corp. "Intel Itanium Architecture Software Developer's Manual", retrieved from the internet: URL:https://people.feebsd.org/~marcel/refs/ia64/sdm-2.2/24531805.pdf, Jan. 2006.

* cited by examiner

SYSTEMS AND METHODS FOR EXPOSING A RESULT OF A CURRENT PROCESSOR INSTRUCTION UPON EXITING A VIRTUAL MACHINE

RELATED APPLICATIONS

This application claims the benefit of the filing date of U.S. provisional patent application No. 62/038,476, filed on Aug. 18, 2014, entitled "Systems And Methods for Exposing A Current Processor Instruction Upon Exiting A Virtual Machine", the entire contents of which are incorporated by reference herein.

BACKGROUND

The invention relates to computer security, and in particular to performing computer security operations in hardware virtualization configurations.

Malicious software, also known as malware, affects a great number of computer systems worldwide. In its many forms such as computer viruses, worms, rootkits, and spyware, malware presents a serious risk to millions of computer users, making them vulnerable to loss of data and sensitive information, identity theft, and loss of productivity, among others.

Modern computing applications often employ hardware virtualization technology to create simulated computer environments known as virtual machines (VM), which behave in many ways as physical computer systems. In applications such as server consolidation and infrastructure-as-a-service, several virtual machines may run simultaneously on the same computer system, sharing the hardware resources among them, thus reducing investment and operating costs. Each virtual machine may run its own operating system and/or software, separately from other virtual machines. Due to the steady proliferation of computer security threats such as malware and spyware, each such virtual machine potentially requires protection.

Some security solutions protect a virtual machine by monitoring the manner in which guest processes executing within the protected VM access memory, to identify potential malicious activity. In one example, a computer security program may configure the processor to generate an internal event (e.g., an exception or a VM exit event) when an attempt is made to write to, or execute code from, a specific region of memory, e.g. a region of memory used by a guest process. Such processor events typically suspend the execution of the current thread and switch the processor to executing an event handler routine, which may form part of the computer security program. The computer security program may thus detect an attempt to access memory in a manner which may be indicative of malware. After analyzing the event, the computer security program may emulate the processor instruction which was under execution when the event occurred, and may return execution to the original thread. Such methods are generically known in the art as trap-and-emulate.

Conventional trap-and-emulate methods may place a substantial computational burden on the host computer system, potentially impacting user experience and productivity. Therefore, there is considerable interest in developing efficient computer security systems and methods suitable for virtualization environments.

SUMMARY

According to one aspect, a host system comprises at least one hardware processor configured to execute a virtual machine and a computer security program. The at least one hardware processor is further configured, in response to receiving a guest instruction for execution, to determine whether executing the guest instruction within the virtual machine causes a violation of a memory access permission. The at least one hardware processor is further configured, in response to determining whether executing the guest instruction causes the violation, when executing the guest instruction causes the violation, to determine a result of applying an operator of the guest instruction to an operand of the guest instruction, to write the result to a predetermined location accessible to the computer security program, and to suspend the execution of the guest instruction. The at least one hardware processor is further configured, in response to suspending the execution of the guest instruction, to switch to executing the computer security program, wherein the computer security program is configured to determine whether the violation is indicative of a computer security threat.

According to another aspect, a method of protecting a host system from computer security threats comprises, in response to receiving a guest instruction for execution, employing at least one processor of the host system to determine whether executing the guest instruction causes a violation of a memory access permission, wherein the guest instruction executes within a guest virtual machine exposed by the host system. The method further comprises, in response to determining whether the guest instruction causes the violation, when executing the guest instruction causes the violation, employing the at least one hardware processor to determine a result of applying an operator of the guest instruction to an operand of the guest instruction, employing the at least one hardware processor to write the result to a predetermined location accessible to the computer security program, and suspending the execution of the guest instruction. The method further comprises, in response to suspending the execution of the guest instruction, switching to executing the computer security program, wherein the computer security program is configured to determine whether the violation is indicative of a computer security threat.

According to another aspect, at least one hardware processor of a host system is configurable, in response to receiving a guest instruction for execution, to determine whether executing the guest instruction causes a violation of a memory access permission, wherein the guest instruction executes within a guest virtual machine exposed by the host system. The at least one hardware processor is further configurable, in response to determining whether the guest instruction causes the violation, when executing the guest instruction causes the violation, to determine a result of applying an operator of the guest instruction to an operand of the guest instruction, to write the result to a predetermined location accessible to the computer security program, and to suspend the execution of the guest instruction. The at least one hardware processor is further configurable, in response to suspending the execution of the guest instruction, to switch to executing a computer security program, wherein the computer security program is configured to determine whether the violation is indicative of a computer security threat.

According to another aspect, a non-transitory computer-readable medium stores instructions which, when executed by at least one hardware processor of a host system, cause the host system to form a computer security program configured to determine whether a violation of a memory access permission is indicative of a computer security threat. The at least one hardware processor is configurable, in response to receiving a guest instruction for execution, to determine whether executing the guest instruction causes the violation, wherein the guest instruction executes within a guest virtual machine exposed by the host system. The at least one hardware processor is further configurable, in response to determining whether the guest instruction causes the violation, when executing the guest instruction causes the violation, to determine a result of applying an operator of the guest instruction to an operand of the guest instruction, to write the result to a predetermined location accessible to the computer security program, and to suspend the execution of the guest instruction. The at least one hardware processor is further configurable, in response to suspending the execution of the guest instruction, to switch to executing the computer security program.

BRIEF DESCRIPTION OF THE DRAWINGS

The foregoing aspects and advantages of the present invention will become better understood upon reading the following detailed description and upon reference to the drawings where:

FIG. 2-A shows an exemplary set of virtual machines exposed by a hypervisor executing on the host system, and a computer security module (CSM) protecting the set of virtual machines according to some embodiments of the present invention.

FIG. 2-B shows an alternative embodiment of the present invention, wherein a CSM executes below a virtual machine, and wherein an exception handler executes within the protected virtual machine.

FIG. 2-C shows yet another embodiment of the present invention, wherein both the CSM and the exception handler execute within the protected virtual machine.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. Unless otherwise specified, a computer security program is a computer program that protects equipment and data against unintended or unauthorized access, modification or destruction. Unless otherwise specified, a process is an instance of a computer program, such as an application or a part of an operating system, and is characterized by having at least an execution thread and a virtual memory space assigned to it, wherein a content of the respective virtual memory space includes executable code. Unless otherwise specified, a page represents the smallest unit of virtual memory that can be individually mapped to a physical memory of a host system. The term "logic" encompasses hardware circuitry having a fixed or a reconfigurable functionality (e.g., field-programmable gate array circuits), but does not encompass software emulating such functionality on a general-purpose computer. Unless otherwise specified, a register represents a storage component integrated with or forming part of a processor, and distinct from random-access memory (RAM). Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
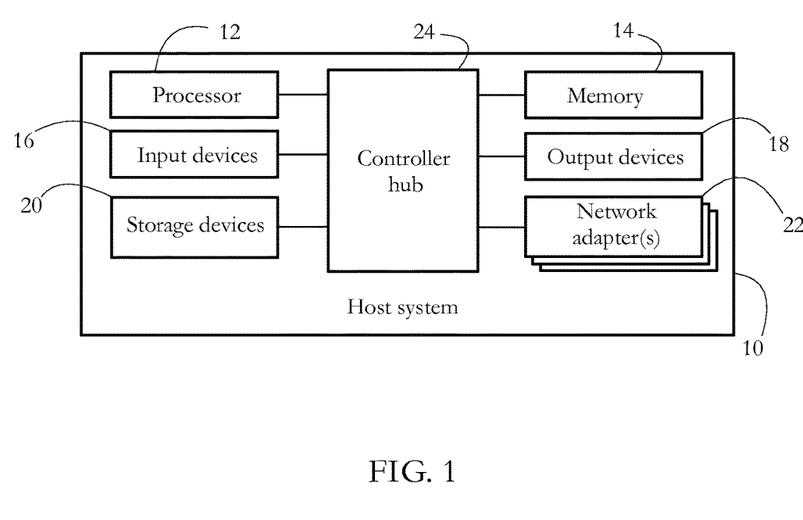
FIG. 1 shows an exemplary hardware configuration of a host computer system according to some embodiments of the present invention.

FIG. 1 shows an exemplary hardware configuration of a host system 10 according to some embodiments of the present invention. Host system 10 may represent a corporate computing device such as an enterprise server, or an end-user device such as a personal computer, tablet computer, or smartphone. Other exemplary host systems include TVs, game consoles, wearable computing devices, or any other electronic device having a memory and a processor. Host system 10 may be used to execute a set of software applications, such as a browser, a word processing application, and an electronic communication (e.g., email, instant messaging) application, among others. In some embodiments, host system 10 is configured to support hardware virtualization and to expose a set of virtual machines, as shown below.

FIG. 1 illustrates a computer system; the hardware configuration of other host systems, such as smartphones and tablet computers, may differ. System 10 comprises a set of physical devices, including a processor 12, a memory unit 14, a set of input devices 16, a set of output devices 18, a set of storage devices 20, and a set of network adapters 22, all connected by a controller hub 24. In some embodiments, processor 12 comprises a physical device (e.g. multi-core integrated circuit formed on a semiconductor substrate) configured to execute computational and/or logical operations with a set of signals and/or data. In some embodiments, such logical operations are delivered to processor 12 in the form of a sequence of processor instructions (e.g. machine code or other type of software). Some embodiments of the present invention introduce changes to the structure and functionality of a conventional processor, the respective changes enabling processor 12 to operate more efficiently in hardware virtualization configurations.

Memory unit 14 may comprise volatile computer-readable media (e.g. RAM) storing data/signals accessed or generated by processor 12 in the course of carrying out instructions. Input devices 16 may include computer keyboards, mice, and microphones, among others, including the respective hardware interfaces and/or adapters allowing a user to introduce data and/or instructions into host system 10. Output devices 18 may include display devices such as monitors and speakers, among others, as well as hardware interfaces/adapters such as graphic cards, allowing host system 10 to communicate data to a user. In some embodiments, input devices 16 and output devices 18 may share a common piece of hardware, as in the case of touch-screen devices. Storage devices 20 include computer-readable media enabling the non-volatile storage, reading, and writing of processor instructions and/or data. Exemplary storage devices 20 include magnetic and optical disks and flash memory devices, as well as removable media such as CD and/or DVD disks and drives. The set of network adapters 22 enables host system 10 to connect to a computer network and/or to other devices/computer systems. Controller hub 24 generically represents the plurality of system, peripheral, and/or chipset buses, and/or all other circuitry enabling the communication between processor 12 and devices 14, 16, 18, 20 and 22. For instance, controller hub 24 may include a memory management unit (MMU), an input/output (I/O) controller, and an interrupt controller, among others. In another example, controller hub 24 may comprise a northbridge connecting processor 12 to memory 14 and/or a southbridge connecting processor 12 to devices 16, 18, 20, and 22. In some embodiments, parts of controller hub (such as the MMU) may be integrated with processor 12, i.e., may share a common substrate with processor 12.

Figure 2:
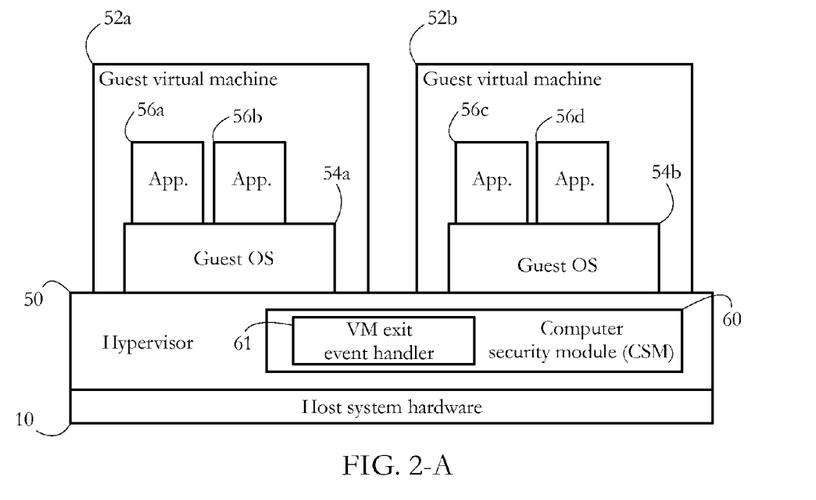

FIG. 2-A shows an exemplary functional configuration according to some embodiments of the present invention, wherein host system 10 uses hardware virtualization technology to operate a set of guest virtual machines 52*a*-*b* exposed by a hypervisor 50. Such configurations are common in applications such as cloud computing and server consolidation, among others. A virtual machine (VM) is known in the art as an abstraction, e.g., a software emulation, of an actual physical machine/computer system, the VM capable of running an operating system and other software. In some embodiments, hypervisor 50 includes software configured to create or enable a plurality of virtualized devices, such as a virtual processor and a virtual controller hub, and to present such virtualized devices to software in place of the real, physical devices of host system 10. Such operations of hypervisor 50 are commonly known in the art as exposing a virtual machine. In some embodiments, hypervisor 50 allows a multiplexing (sharing) by multiple virtual machines of hardware resources of host system 10. Hypervisor 50 may further manage such multiplexing so that each guest VM 52*a*-*b* operates independently and is unaware of other VMs executing concurrently executing on host system 10. Examples of popular hypervisors include the VMware vSphere™ from VMware Inc. and the open-source Xen hypervisor, among others.

Each VM 52*a*-*b* may execute a guest operating system (OS) 54*a*-*b*, respectively. A set of exemplary applications 56*a*-*d* generically represent any software application, such as word processing, image processing, media player, database, calendar, personal contact management, browser, gaming, voice communication, data communication, and anti-malware applications, among others. Operating systems 54*a*-*b* may comprise any widely available operating system such as Microsoft Windows®, MacOS®, Linux®, iOS®, or Android™, among others. Each OS 54*a*-*b* provides an interface between applications executing within the respective VM and the virtualized hardware devices of the respective VM. In the following description, software executing on a virtual processor of a virtual machine is said to execute within the respective virtual machine. For instance, in the example of FIG. 2-A, applications 56*a*-*b* are said to execute within guest VM 52*a*, while applications 56*c*-*d* are said to execute within guest VM 52*b*. In contrast, hypervisor 50 is said to execute outside, or below, guest VMs 52*a*-*b*.

Figure 3:
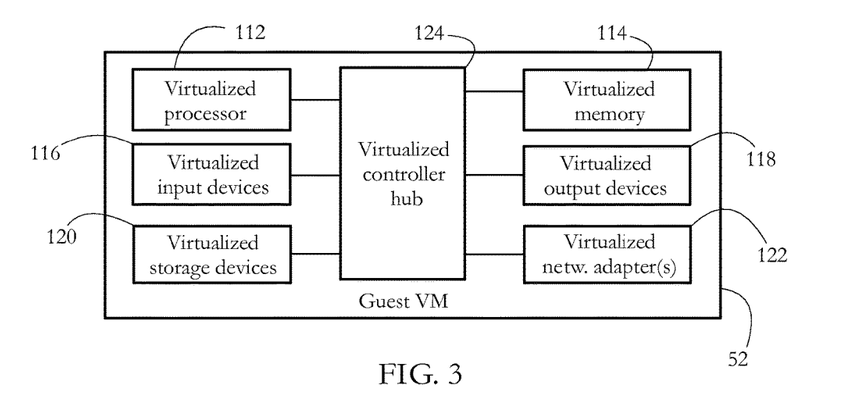
FIG. 3 shows an exemplary configuration of virtualized hardware exposed as a guest virtual machine according to some embodiments of the present invention.

FIG. 3 shows an exemplary configuration of a virtual machine 52, as exposed by hypervisor 50. VM 52 may represent any of VMs 52*a*-*b* of FIG. 2-A. VM 52 includes a virtualized processor 112, a virtualized memory unit 114, virtualized input devices 116, virtualized output devices 118, virtualized storage 120, virtualized network adapters 122, and a virtualized controller hub 124. Virtualized processor 112 comprises an emulation of at least some of the functionality of processor 12, and is configured to receive for execution processor instructions forming part of software such as an operating system and other applications. Software using processor 112 for execution is deemed to execute within virtual machine 52. In some embodiments, virtualized memory unit 114 comprises addressable spaces for storing and retrieving data used by virtualized processor 112. Other virtualized devices (e.g., virtualized input, output, storage, etc.) emulate at least some of the functionality of the respective physical devices of host system 10. Virtualized processor 112 may be configured to interact with such virtualized devices as it would with the corresponding physical devices. For instance, software executing within VM 52 may send and/or receive network traffic via virtualized network adapter(s) 122. In some embodiments, hypervisor 50 may expose only a subset of virtualized devices to VM 52 (for instance, only virtualized processor 112, virtualized memory 114, and parts of hub 124). Hypervisor 50 may also give a selected VM exclusive use of some hardware devices of host system 10. In one such example, VM 52*a* (FIG. 2-A) may have exclusive use of input devices 16 and output devices 18, but lack a virtualized network adapter. Meanwhile, VM 52*b* may have exclusive use of network adapter(s) 22. Such configurations may be implemented, for instance, using VT-D® technology from Intel®.

Modern processors implement a hierarchy of processor privilege levels, also known in the art as protection rings. Each such ring or level is characterized by a set of actions and/or processor instructions that software executing within the respective ring is allowed to carry out. Exemplary privilege levels/rings include user mode (ring 3) and kernel mode (ring 0). Some host systems configured to support hardware virtualization may include an additional ring with the highest processor privileges (e.g., ring −1, root mode, or VMXroot on Intel® platforms). In some embodiments, hypervisor 50 takes control of processor 12 at the most privileged level (ring −1), thus creating a hardware virtualization platform exposed as a virtual machine to other software executing on host system 10. An operating system, such as guest OS 54a in FIG. 2-A, executes within the virtual environment of the respective VM, typically with lesser processor privilege than hypervisor 50 (e.g., in ring 0 or kernel mode). Common user applications, such as 56a-b, typically execute at lesser processor privilege than OS 34a (e.g., in ring 3 or user mode). Some parts of applications 56a-b may execute at kernel privilege level, while some parts of OS 34a may execute in user mode (ring 3). When a software object attempts to execute an action or instruction requiring processor privileges higher than allowed by its assigned protection ring, the attempt typically generates a processor event, such as an exception or a fault, which transfers control of processor 12 to an entity (e.g., handler routine) executing in a ring with enough privileges to carry out the respective action.

In particular, an attempt to perform certain actions or to execute certain instructions from within a guest VM may trigger a special category of processor events, herein generically termed VM suspend events. In some embodiments, a VM suspend event suspends execution of the current thread within a guest VM and switches processor 12 to executing a handler routine. Exemplary VM suspend events include, among others, a VM exit event (e.g., VMExit on Intel® platforms) and a virtualization exception (e.g. #VE on Intel® platforms). VM exit events switch processor 12 to executing a handler routine outside the respective guest VM, typically at the level of hypervisor 50. Virtualization exception may switch processor 12 to executing a handler routine within the respective guest VM, instead of exiting the respective VM.

Exemplary instructions triggering a VM suspend event include VMCALL on Intel® platforms. VM suspend events may also be triggered by other events, such as memory access violations. In one such example, when a software object executing within a VM attempts to write to a section of memory marked as non-writable, or to execute code from a section of memory marked as non-executable, processor 12 may generate a VM exit event. Such VM-switching mechanisms allow, for example, a computer security program to protect a virtual machine from outside the respective VM. The computer security program may intercept VM exit events occurring in response to certain actions performed by software running inside the VM, actions which may be indicative of a security threat. The computer security program may then block and/or further analyze such actions, potentially without the knowledge of in-VM software. Such configurations may substantially strengthen computer security.

In some embodiments (e.g., FIG. 2-A), hypervisor 50 includes a computer security module (CSM) 60, configured to perform such computer security operations, among others. Module 60 may be incorporated into hypervisor 50 (for instance as a library), or may be delivered as a computer program distinct and independent from hypervisor 50, but executing at the privilege level of hypervisor 50. A single module 60 may be configured to protect multiple guest VMs executing on host system 10. Security operations carried out by module 60 may include detecting an action performed by a process executing within a guest VM (e.g., calling certain functions of the OS, accessing a registry of the OS, downloading a file from a remote location, writing data to a file, etc.). Other security operations of module 60 may comprise determining an address of a memory section containing a part of a software object executing within a guest VM, accessing the respective memory section, and analyzing a content stored within the respective memory section. Other examples of security operations include intercepting and/or restricting access to such memory sections, e.g., preventing the over-writing of code or data belonging to a protected process, and preventing the execution of code stored in certain memory pages. In some embodiments, CSM 60 includes a VM exit event handler 61 configured to intercept VM exit events occurring within guest VMs 52a-b. In an alternative embodiment, handler 61 may be a distinct module (e.g., a library) of hypervisor 50, separate from CSM 60, which intercepts VM exit events and selectively transfers control to CSM 60 after determining a reason and/or a type of each VM exit that occurred.

FIG. 2-B illustrates an alternative embodiment wherein computer security module 60 protects a guest VM 52c from outside the respective VM. In such embodiments, processor 12 may be configured to generate a virtualization exception (instead of a VM exit event, as described above in relation to FIG. 2-A) when a memory access violation occurs. In the exemplary embodiment of FIG. 2-B, a virtualization exception handler 63 executes within VM 52c, for instance at the privilege level of an operating system Mc, and is configured to intercept virtualization exceptions and interface with CSM 60.

Communication between handler 63 and CSM 60 may proceed according to any inter-process communication method known in the art. To transmit data from within the protected VM to the level of hypervisor 50, some embodiments of handler 63 use a specialized instruction (e.g., VMCALL on Intel® platforms) to transfer control of processor 12 from the respective VM to hypervisor 50. The data being transmitted may be placed by exception handler 63 in a predetermined section of memory shared with CSM 60. To transmit data to handler 63, some embodiments of CSM 60 may inject an interrupt into VM 52c, the interrupt handled by handler 63. The respective data may be transferred again through the shared memory section described above.

In yet another embodiment, illustrated in FIG. 2-C, both CSM 60 and handler 63 execute within the protected VM, for instance in kernel mode (ring 0). Such embodiments may also employ virtualization exceptions to detect memory access violations. Deciding between configurations 2-A-B-C may comprise evaluating a trade-off between performance and security. VM exit events are relatively costly in terms of computation, typically requiring loading and/or unloading of large data structures into/from memory with each exit and re-entry cycle. Hence, configurations such as 2-A may require more computation to intercept an event than configurations such as 2-B-C. On the other hand, keeping critical security components such as CSM 60 and handlers 61-63 outside the protected VM (as in examples 2-A-B) may strengthen security, since it may be more difficult for malware executing within the respective VM to interfere with the operation of such components.

To be able to protect a guest VM in a configuration as illustrated in FIG. 2-A-B (i.e., from outside the respective VM), some embodiments of CSM 60 employ address translation data structures and/or address translation mechanisms of processor 12. Virtual machines typically operate with a virtualized physical memory (see, e.g., memory 114 in FIG. 3), also known in the art as guest-physical memory. Virtualized physical memory comprises an abstract representation of the actual physical memory 14, for instance as a contiguous space of addresses, commonly termed guest-physical addresses (GPA). Each such address space is uniquely attached to a guest VM, with parts of said address space mapped to sections of physical memory 14 and/or physical storage devices 20. In systems configured to support virtualization, such mapping is typically achieved using hardware-accelerated, dedicated data structures and mechanisms controlled by processor 12, known as second level address translation (SLAT). Popular SLAT implementations include extended page tables (EPT) on Intel® platforms, and rapid virtualization indexing (RVI)/nested page tables (NPT) on AMD® platforms. In such systems, virtualized physical memory may be partitioned in units known in the art as pages, a page representing the smallest unit of virtualized physical memory individually mapped to physical memory via mechanisms such as EPT/NPT, i.e., mapping between physical and virtualized physical memory is performed with page granularity. All pages typically have a predetermined size, e.g., 4 kilobytes, 2 megabytes, etc. The partitioning of virtualized physical memory into pages is usually configured by hypervisor 50. In some embodiments, hypervisor 50 also configures the SLAT structures, and therefore configures address translation between physical memory and virtualized physical memory. Such address translations are known in the art as guest-physical to host-physical (GPA-to-HPA) translations.

In some embodiments, the operating system executing within a VM sets up a virtual memory space for each process executing within the respective VM, said virtual memory space representing an abstraction of physical memory. Process virtual memory typically comprises a contiguous space of addresses, commonly known in the art as guest-virtual addresses (GVA) or guest-linear addresses (GLA). In some embodiments, process virtual memory spaces are also partitioned into pages, such pages representing the smallest unit of virtual memory individually mapped by the OS to the virtualized physical memory of the respective VM, i.e., virtual to virtualized-physical memory mapping is performed with page granularity. The OS may configure a dedicated data structure, such as a page table, used by the virtualized processor of the respective VM to perform guest virtual to guest physical, or GVA-to-GPA address translations.

Figure 4:
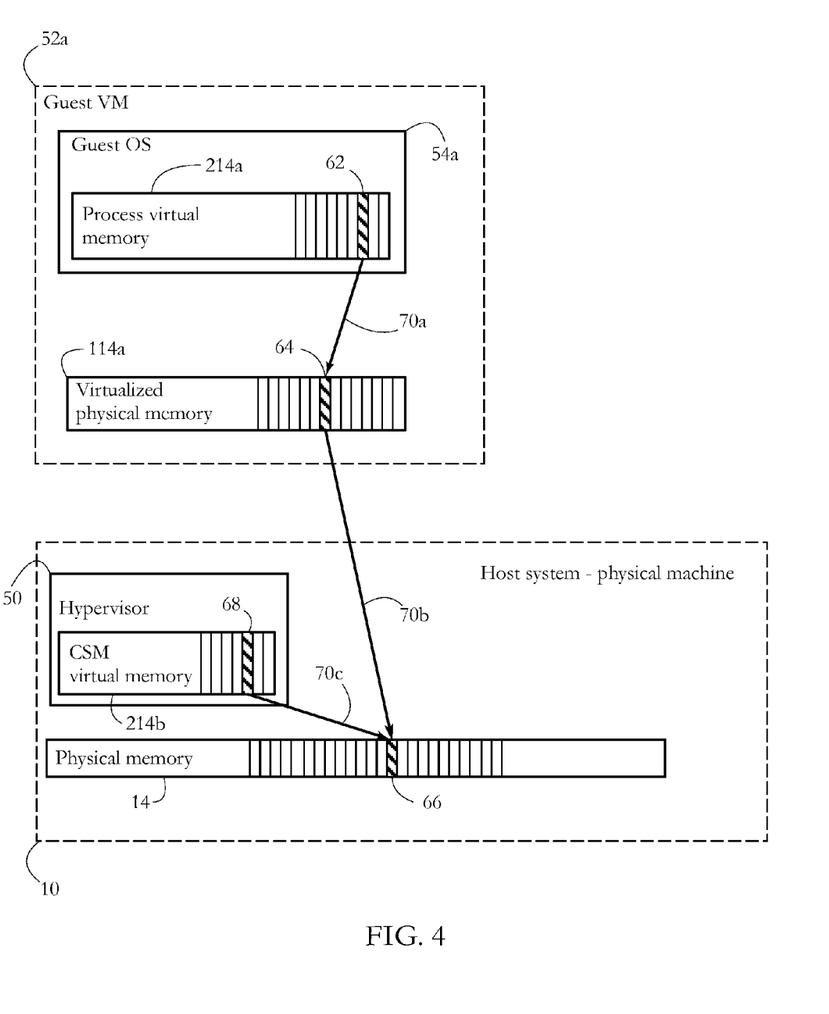
FIG. 4 shows a set of exemplary memory address translations in a hardware virtualization configuration as shown in FIG. 2-A, according to some embodiments of the present invention.

FIG. 4 illustrates an exemplary memory address translation in the embodiment of FIG. 2-A. Following exposure by hypervisor 50, guest VM 52a sees a virtualized physical memory space 114a as its own physical memory space. A process executing within guest VM 52a is assigned a virtual memory space 214a by guest OS 54a. When the process attempts to access memory at a guest-virtual address 62, GVA 62 is translated by the (virtualized) MMU of guest VM 52a into a guest-physical address 64 within virtualized physical memory space 114a. GVA-to-GPA translation 70a may proceed, for instance, according to page tables configured and controlled by guest OS 34a. GPA 64 is further mapped by the MMU to a host-physical address (HPA) 66 within physical memory 14 of host system 10. GPA-to-HPA translation 70b may proceed, for instance, according to SLAT structures configured by hypervisor 50.

Each process executing below guest VMs 52a-b is typically assigned a virtual memory space addressable via what is known in the art as host-virtual addresses (HVA). In the example of FIG. 4, hypervisor 50 sets up a virtual memory space 214b for computer security module 60. CSM 60 may then reference HPA 66 via a HVA 68. When module 60 is integrated within hypervisor 50, for instance as a library, memory space 214b may coincide with the virtual memory space of hypervisor 50. To manage such spaces, hypervisor 50 may configure dedicated data structures and mechanisms (e.g. page tables) used by the MMU to perform HVA-to-HPA translations such as translation 70c.

In some embodiments, hypervisor 50 and/or CSM 60 may set access permissions for each of a subset of physical memory pages. Such memory pages may be used, for instance, by certain critical guest processes executing within a protected VM, such as processes of the OS and/or anti-malware routines. Access permissions indicate, for instance, whether the respective page may be read from and written to, and whether software is allowed to execute code from the respective page. Access permissions may be indicated, for instance, as a part of the SLAT entry representing the respective memory page. Some host systems may allow setting access permissions with sub-page granularity.

Hypervisor 50 and/or CSM 60 may further configure processor 12 to generate a VM suspend event when software executing within a guest VM attempts to access memory in a manner that violates access permissions (e.g., to write to a memory page marked as non-writable). Such an attempt is hereby termed memory access violation. The respective VM suspend event may be a VM exit event in configurations such as FIG. 2-A, and a virtualization exception in configurations such as FIG. 2-B-C.

Figure 5:
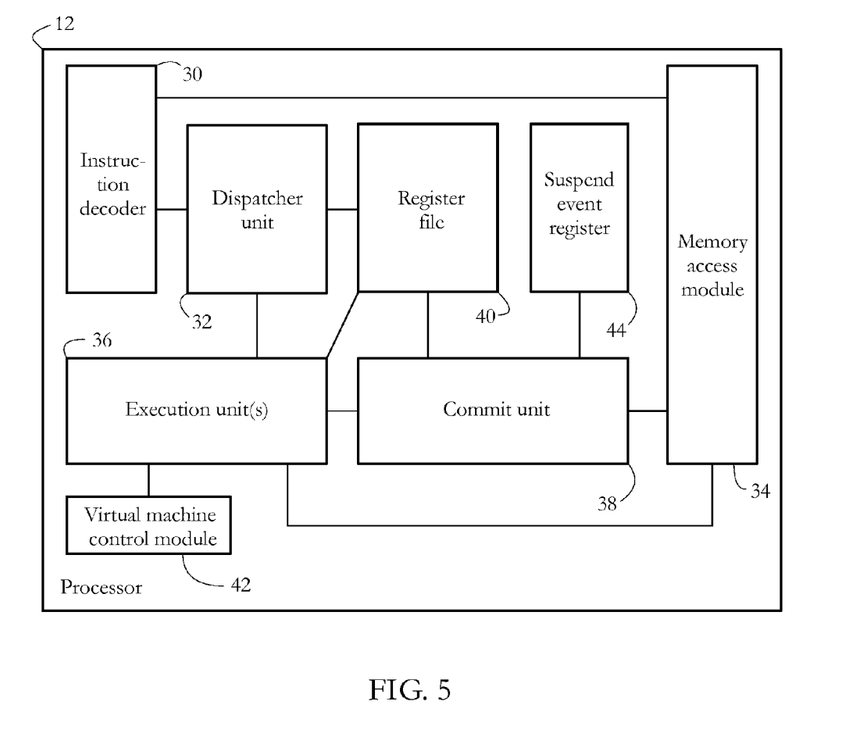
FIG. 5 shows exemplary components of a processor according to some embodiments of the present invention.

Some embodiments of the present invention introduce changes to the structure and functionality of a conventional hardware processor, to enable the processor to function more efficiently in hardware virtualization configurations. FIG. 5 shows exemplary hardware components of processor 12 according to some embodiments of the present invention. The illustrated components are meant as generic devices performing the described functionality; structural details may vary substantially among implementations. For instance, each illustrated component may comprise multiple interconnected subsystems, not necessarily in physical proximity to each other. The illustrated components are not exhaustive; processor 12 may include many other components (e.g., scheduler, interrupt controller, various caches, etc.), which were omitted from FIG. 5 to simplify presentation.

Processor 12 may include logic/circuitry configured to carry out various stages of a processor pipeline. For instance, an instruction decoder 30 performs instruction decoding operations, which may include translating each processor instruction into a set of elementary processor operations and/or micro-ops. A set of execution units 36 connected to decoder 30 may perform the execution stage of the pipeline. Exemplary execution unit(s) 36 include, among others, an arithmetic logic unit (ALU) and a floating-point unit (FPU).

In some embodiments, the execution stage of the pipeline for an instruction comprises determining a result of applying an operator of the respective instruction to an operand of the respective instruction. Such results may comprise, among others, a memory address, a value to be committed to a memory address or to a processor register (e.g., to a general purpose register such as AX, a model-specific register—MSR, a control register such as EFLAGS, or a hidden register such as the hidden part of an x86 segment register, also known as a descriptor cache), a value of the instruction pointer (e.g., RIP), and a value of the stack pointer (e.g., RSP).

The operand(s) of an instruction may be explicit in the statement of the instruction, or may be implicit. An exemplary x86 instruction with implicit operands is the STC instruction, which sets the carry flag of the EFLAGS control register of the processor to 1. In some embodiments, the register EFLAGS and the value 1 are interpreted as (implicit) operands, although they do not appear explicitly in the statement of the STC instruction.

A commit unit 38 may perform the commit stage of the pipeline, i.e., to store the output of execution unit(s) 36 in memory 14 and/or to update the contents of certain processor registers to reflect changes/results produced by the execution stage. Commit unit 38 may comprise logic modules known in the art as retirement units.

A memory access module 34 connected to decoder 30 and execution unit(s) 36 includes logic configured to interface with memory 14, e.g., to fetch instructions from memory, to load data from memory, and to store results of execution of processor instructions to memory. In some embodiments, memory access module comprises an MMU configured to perform the virtual-to-physical address translations necessary for memory access.

Modern processors typically support out-of-order and/or speculative execution of processor instructions. In such systems, multiple instructions are concurrently fetched, decoded, and executed by the same execution unit(s) 36. Results of such executions are then committed in-order, to preserve the intended flow of the respective computer program. Such configurations are used, for instance, in conjunction with branch prediction algorithms, to enhance the performance of processor 12. In some embodiments configured for out-of-order execution, processor 12 may further comprise a dispatcher unit 32 coupled to decoder 30 and to execution units 36, and a register file 40 coupled to execution unit(s) 36 and commit unit 38. Dispatcher unit 36 may schedule individual micro-ops for execution, and maintain a mapping associating each micro-op with its respective instruction, to control the order of execution and commit. Register file 40 comprises an array of internal processor registers, organized, for instance, as a reorder buffer. Register file 40 may further comprise logic enabling dispatcher unit 36 to associate a row of registers of file 40 to each scheduled micro-op, an operation known in the art as register renaming. In such configurations, each such row of registers may hold, for instance, the values of the general purpose and/or status registers of processor 12, said values corresponding to an intermediate stage of execution of a certain processor instruction.

Processor 12 may further include a virtual machine control unit 38 configured to manage virtual machine state data. In some embodiments, a virtual machine state object (VMSO) comprises a data structure used internally by processor 12 to represent the current state of each virtualized processor exposed on host system 10. Exemplary VMSOs include the virtual machine control structure (VMCS) on Intel® platforms, and the virtual machine control block (VMCB) on AMD® platforms. VMSOs are typically set up by hypervisor 50 as part of exposing each virtual machine. In some embodiments, processor 12 associates a region in memory with each VMSO, so that software may reference a specific VMSO using a memory address or pointer (e.g., VMCS pointer on Intel® platforms).

Each VMSO may comprise a guest state area and a host state area, the guest state area holding the CPU state of the respective guest VM, and the host state area storing the current state of hypervisor 50. In some embodiments, the guest-state area of the VMSO includes contents of the control registers (e.g., CR0, CR3, etc.), instruction pointer (e.g., RIP), general-purpose registers (e.g., EAX, ECX, etc.), and status registers (e.g., EFLAGS) of the virtual processor of the respective guest VM, among others. The host state area of the VMSO may include a pointer (e.g., an EPT pointer on Intel® platforms) to a SLAT data structure configured for GPA-to-HPA address translations for the respective guest VM.

In some embodiments, processor 12 may store a part of a VMSO within dedicated internal registers/caches, while other parts of the respective VMSO may reside in memory. At any given time, at most one VMSO (herein termed the current VMSO) may be loaded onto the processor, identifying the virtual machine currently having control of processor 12. Modern processors are typically configured for multithreading. In such configurations, physical processor 12 may operate a plurality of cores, each core further comprising multiple logical processors, wherein each logical processor may process an execution thread independently of, and concurrently with, other logical processors. Multiple logical processors may share some hardware resources, for instance, a common MMU. In a multithreaded embodiment, a distinct VMSO may be loaded onto each distinct logical processor.

When processor 12 switches from executing the respective VM to executing hypervisor 50 (e.g., upon a VM exit), processor 12 may save the state of the respective VM to the guest state area of the current VMSO. When processor 12 switches from executing a first VM to executing a second VM, the VMSO associated to the first VM is unloaded, and the VMSO associated to the second VM is loaded onto the processor, the second VMSO becoming the current VMSO. In some embodiments, such loading/unloading of VMSO data to/from processor 12 is performed by virtual machine control module 38. Module 38 may further carry out the retrieval and/or saving of VMSO data from/to memory 14.

In some embodiments, processor 12 further comprises a suspend event register 44 connected to execution unit(s) 36 and/or to commit unit 38, and configured to store instruction-specific data associated with a guest instruction, wherein execution of said guest instructions has caused a VM suspend event (e.g., a VM exit or a virtualization exception). In some embodiments, suspend event register 44 is an exposed register, accessible to software executing on host system 10, i.e., data stored in register 44 may be readable by software such as security module 60. In one such example, suspend event register 44 includes a model-specific register (MSR) of processor 12. Some embodiments may restrict access to register 44 to a subset of software objects, selected according to a criterion such as processor privilege (e.g., only ring −1 or root mode) or object type (e.g., only drivers). Some embodiments may restrict software access to register 44 only to a subset of operations (e.g., read only).

Figure 6:
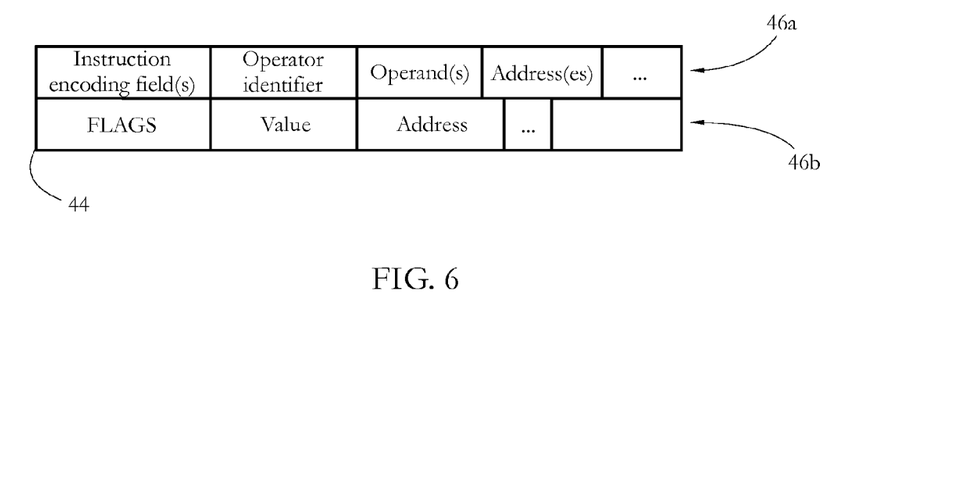
FIG. 6 shows an exemplary suspend event register of the processor according to some embodiments of the present invention.

FIG. 6 shows an exemplary set of fields of suspend event register 44 according to some embodiments of the present invention. Register 44 may include a disassembly field 46a and an execution result field 46b. Disassembly field 46a may store data resulting from disassembling the respective guest instruction.

Figure 7:
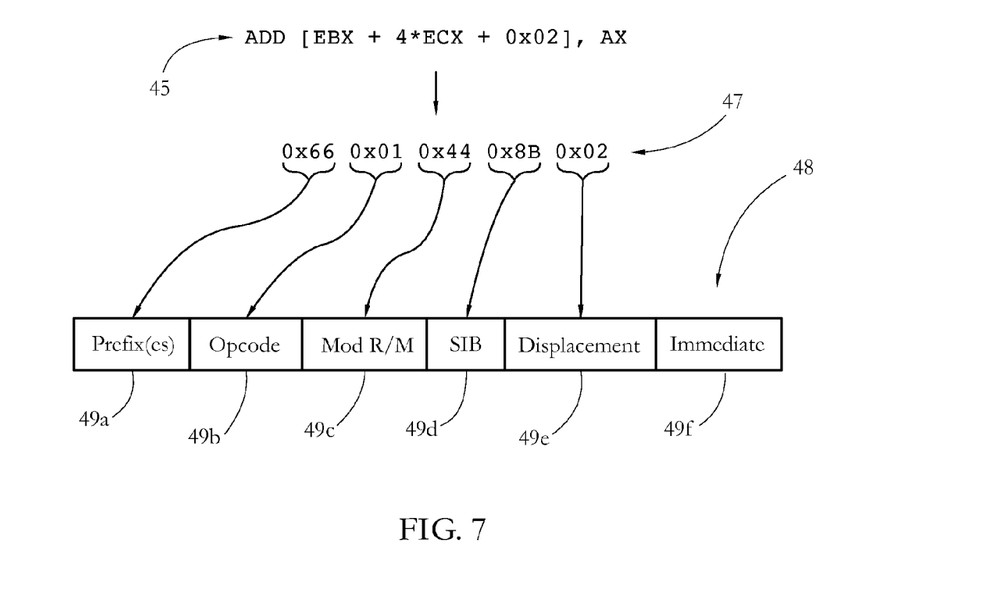
FIG. 7 shows an assembly language representation of an exemplary processor instruction of the x86 instruction set, and its corresponding machine code representation.

FIG. 7 shows an assembly language representation 45 of an exemplary Intel® x86 processor instruction. The illustrated instruction instructs the processor to increment the content stored in memory at the (virtual) address EBX+4*ECX+0x02, by the value currently stored in register AX. The respective instruction is represented in memory as a machine code representation 47; the translation between representations 45 and 47 is typically done by a compiler or assembler. The machine code representation of x86 instructions has a generic form 48, comprising a sequence of encoding fields, including, among others, a prefix, an opcode, and a displacement field (representations of instructions of other ISAs may differ). FIG. 7 shows the instance of each encoding field for the given exemplary x86 instruction. In some ISAs, the machine code representation may vary in length, i.e., some encoding fields may appear in the machine code representation of certain instructions, but may not appear in the representation of other instructions.

In some embodiments, disassembling an instruction comprises parsing the machine code representation of the instruction to identify and/or compute a set of semantic elements. Such semantic elements may include an operator (e.g., MOV, ADD, etc.) and an operand (e.g., AX, [EBX+ 4*ECX+0x02]) of the instruction, among others. In some embodiments, semantic elements of an instruction include individual instruction encoding fields (such as Prefix, Opcode, modR/M, SIB, Displacement, and Immediate, in the case of the x86 ISA). Such disassembly may be carried out, at least in part, by instruction decoder 30 and/or by execution unit(s) 36.

In the example of FIG. 7, disassembling the instruction may comprise determining the contents of individual encoding fields, as shown by the arrows indicating the correspondence between machine code representation 47 and generic form 48. In some embodiments, disassembling the illustrated instruction includes identifying the ADD operator and/or determining according to machine code 47 that the respective instruction has two operands, that one of the operands is the content of the AX register, that the second operand is a content of memory, and determining an expression (e.g., EBX+4*ECX+0x02) of the respective memory address. In some embodiments, disassembling the instruction further comprises computing a memory address indicated by an operand of the respective instruction (e.g., the value of the expression EBX+4*ECX+0x02 in the example of FIG. 7). In another example, wherein the disassembled instruction is relative jump instruction (e.g., JMP $+10 on x86 platforms, represented in machine code as 0xEB 0x08), disassembling the instruction may comprise calculating an absolute memory address of the destination according to the address of the instruction, to the length of the instruction, and/or to the size of the relative jump.

In some embodiments, disassembly field 46a of register 44 (FIG. 6) includes a content of the instruction encoding fields of the respective instruction (see FIG. 7). Other exemplary content of field 46a includes an operator identifier indicating the operator of the respective instruction, and an indicator of an operand of the respective instruction. The operand indicator may further include an identifier of a processor register (e.g., AX), and a flag indicating, for instance, whether the respective operand is the content of a register or a content of memory. Disassembly field 46a may further comprise a memory address (e.g., GVA, GPA, and/or HPA) indicated by an operand. The structure of disassemble field 46a may be platform-specific. For instance, on Intel® platforms, disassembly field 46a may include a content of a prefix, opcode, modR/M, SIB, displacement, and immediate encoding fields of the current guest instruction. On other platforms, field 46a may store other values according to the instruction set architecture (ISA) of the respective platform.

In some embodiments, execution result field 46b of suspend event register 44 may store data indicative of a result of executing the respective processor instruction. Such results may include a value of a status register (e.g., FLAGS), a value of an instruction pointer (e.g., RIP), and a value of a general purpose register (e.g., EAX) resulting from executing the respective instruction. Field 46b may further comprise a value to be committed to memory as a result of executing the respective instruction, a size of the respective value (e.g., byte, word, etc.) and/or a memory address where the respective value is to be committed.

In some embodiments, execution unit(s) 36 and/or commit unit 38 may be configured to determine whether execution of a guest instruction causes a VM processor event (such as a VM exit of virtualization exception), and when yes, to save instruction disassembly data to suspend event register 44 before generating the respective event. Processor 12 may be further configured to delay the generation of the processor event until completion of the execution stage of the respective guest instruction, and to save a result of executing the respective instruction to event register 44 instead of committing such results to memory and/or to a general purpose register of processor 12. To avoid committing results of such instructions, processor 12 may be configured to generate the VM processor event before the commit stage of the pipeline for the respective instruction. Such functionality will be further detailed below.

Figure 8:
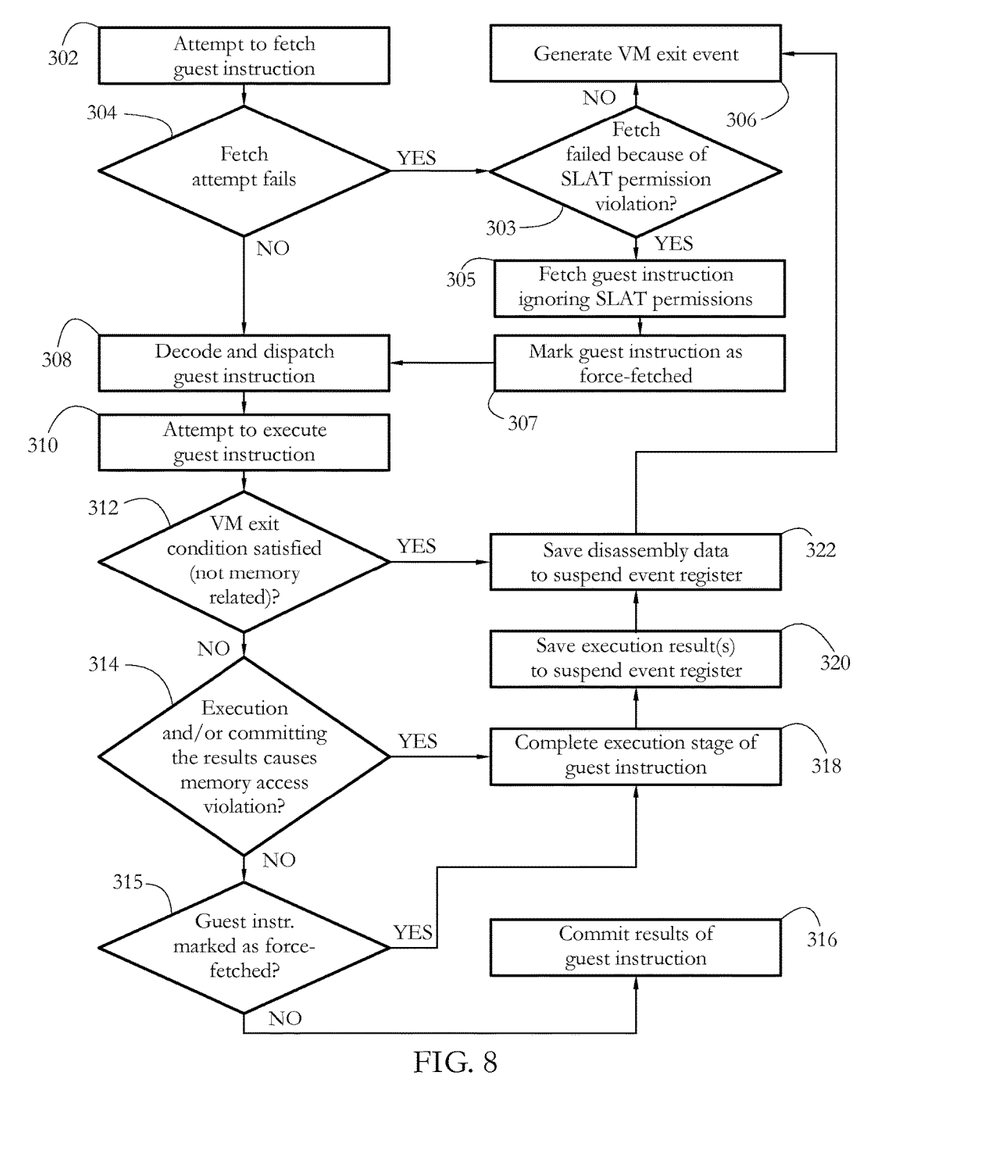
FIG. 8 shows an exemplary sequence of steps performed by the processor to execute a processor instruction according to some embodiments of the present invention.

FIG. 8 shows a detailed, exemplary sequence of steps performed by processor 12 to execute a guest instruction according to some embodiments of the present invention. FIG. 8 shows an embodiment, wherein processor 12 is configured to generate a VM exit event in response to a memory access violation. A skilled artisan will appreciate that the present description may easily be modified to cover an embodiment, which generates other VM suspend events (such as a virtualization exception) instead of a VM exit event. "Guest instruction" is a term used herein to denote a processor instructions forming part of a computer program executing within a guest VM, such as VMs 52a-b in FIG. 2-A.

A step 302 attempts to fetch the guest instruction. When the fetch attempt fails, a step 303 may determine whether the failure is caused by a memory access violation (for instance, when the guest instruction resides in a memory page marked as non-executable in a SLAT structure of the guest VM). When no, in a step 306, processor 12 generates a VM exit event and transfers execution to an event handler, such as handler 61 in FIG. 2-A. When failure to fetch the guest instruction is caused by a memory access violation, such a failure may be indicative of a security program (e.g., antimalware module) trying to protect a content of the respective memory page. One exemplary memory section typically protected from execution in this manner stores an execution stack of a guest process. Marking the stack as non-executable may protect the guest process, for instance, from a stack exploit. In such situations, some embodiments may re-attempt to fetch the guest instruction, ignoring the respective memory access permissions (step 305). In a step 307, the fetched guest instruction is marked with a dedicated flag, to indicate that the respective instruction was "force-fetched", i.e., was fetched while breaking memory access permissions. Processor 12 may then proceed to a step 308.

Following the fetch stage, step 308 decodes and dispatches the guest instruction. In a step 310, the guest instruction is launched into execution. When executing the guest instruction satisfies a criterion for VM exit, wherein the criterion is not related to memory access, processor 12 proceeds to a step 322 detailed below. Such VM exits may be triggered in a variety of situations. For instance, the guest instruction may be a specialized instruction, such as VMCALL, which automatically trigger a VM exit event when called from within a guest VM. Another exemplary reason for VM exit, which is not related to memory access, is the occurrence of a hardware event (e.g., an interrupt) during execution of the guest instruction.

When executing the guest instruction causes a memory access violation (for instance, when the guest instruction instructs the processor to write a result to a memory page marked as non-writable), a conventional processor typically suspends execution of the guest instruction, flushes the processor pipeline(s) and generates a VM suspend event (e.g. VMExit). In contrast, in some embodiments of the present invention, execution of the guest instruction is not suspended. Instead, in a step 318, the VM exit event is delayed until the execution stage of the pipeline for the guest instruction finishes. However, in some embodiments, the results of the completed execution stage are not committed, as would happen in conventional systems. Instead, in a step 320, processor 12 may instruct commit unit 38 to store the results of the completed execution stage of the guest instruction in suspend event register 44. Such functionality may be achieved, for instance, using an activation signal to switch commit unit 38 from committing results to memory and/or general purpose registers of processor 12, to storing results in register 44 when a memory access violation has occurred. The control signal may indicate whether execution of the guest instruction has caused a memory access violation. Commit unit 38 may receive such a signal, for instance, from the MMU via memory access module 34. In some embodiments, step 320 comprises commit unit 38 retrieving a result of executing the guest instruction from register file 40.

In an alternative embodiment, instead of saving execution results of the guest instruction to register 44, step 320 may save such results to a dedicated memory region, such as the guest state area of the VMSO of the respective guest VM. In yet another embodiment, processor 12 may transmit such results to VM exit handler 61 upon executing the VM exit (step 306).

In a step 322, processor 12 may store results of disassembling the guest instruction to suspend event register 44 (and/or to memory as described above). Alternatively, instruction disassembly data may be stored to a dedicated area of the VMSO of the currently-executing guest VM. Instruction disassembly data may be produced by instruction decoder 30 and/or execution unit(s) 36 in the process of decoding and/or executing the guest instruction; step 322 may include retrieving such data from the respective processor module. After storing execution results and/or disassembly data for the guest instruction, processor 12 may generate a VM exit event (step 306).

When execution of the current guest instruction proceeds without causing memory access violations (step 314) and without non-memory related reasons for a VM exit (step 312), a step 315 may determine whether the current guest instruction was force-fetched (see steps 305-307 above). When no, a step 316 commits results of the execution to memory and/or to general purpose processor registers. When the current guest instruction is force-fetched, some embodiments may treat the respective instruction as an instruction causing a memory access violation, i.e., by waiting for the respective instruction to complete the execution stage of the pipeline, storing results and/or instruction disassembly data to register 44, before generating a VM exit event (see steps 318-320-322-306 above).

Figure 9:
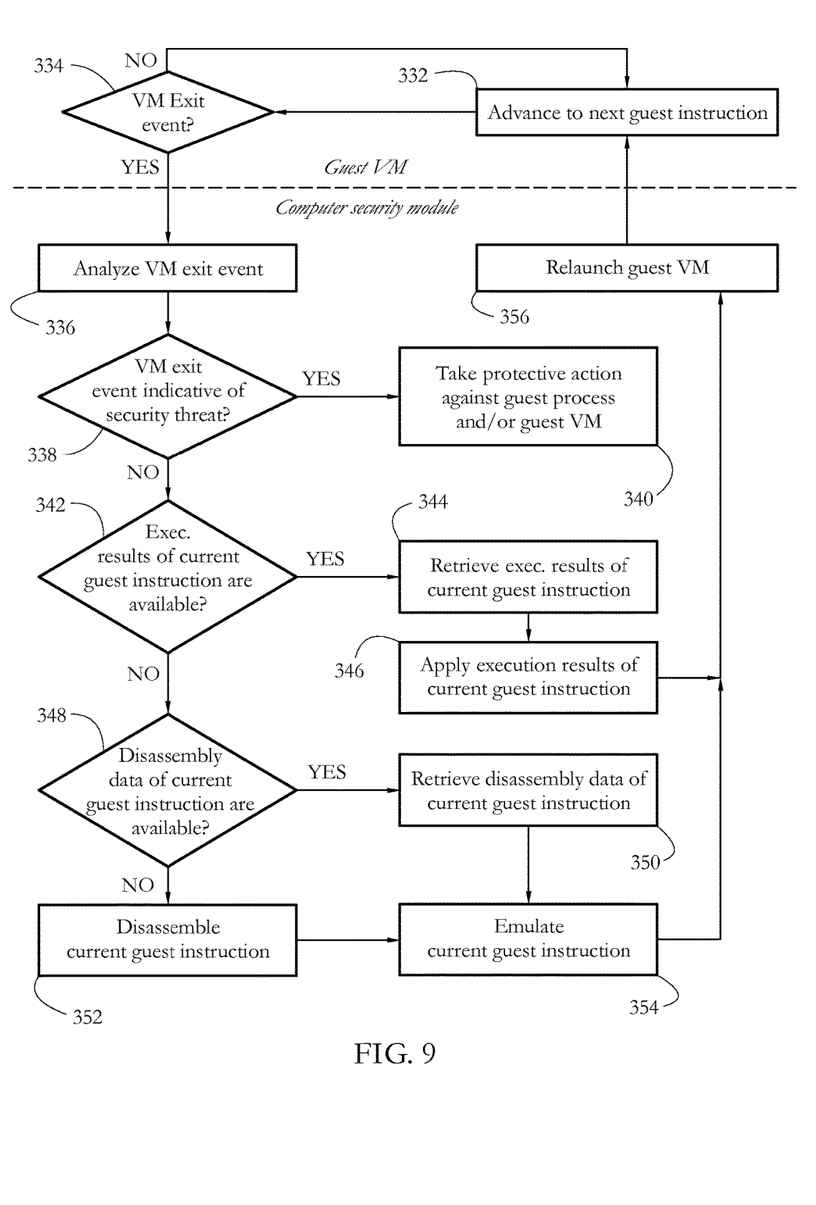
FIG. 9 illustrates an exemplary sequence of steps performed by a computer security module to protect a guest virtual machine according to some embodiments of the present invention.

FIG. 9 shows an exemplary sequence of steps performed by a guest VM and/or by computer security module 60 (FIG. 2-A-B) according to some embodiments of the present invention related to computer security. A guest process, such as an application (e.g., 56a in FIG. 2-A) or a process of the operating system (e.g., guest OS 54a in FIG. 2-A) may execute within the guest VM, advancing stepwise through a sequence of guest instructions (step 332). Execution of the guest process continues until a VM exit is generated, according, for instance, to a scenario described above in relation to FIG. 8. A skilled artisan may appreciate how the description may be adapted to a system wherein processor 12 generates a virtualization exception instead of a VM exit event, and wherein an exception handler executing within the guest VM (e.g., handler 63 in FIG. 2-B) is configured to intercept the respective exception.

In a step 336, handler 61 intercepts the VM exit event, which is analyzed for evidence of a security threat. When the event indicates a security threat (e.g., an operation executed with malicious intent), in a step 340, CSM 60 may take protective action against the guest process and/or against the guest VM. Such action may include, among others, blocking the execution of the guest process, returning an error message or a set of dummy results to the guest process, and alerting an administrator of the host system.

When the VM exit event is not indicative of a security threat, a step 342 determines whether the results of executing the guest instruction are available (either in event register 44 of processor 12 or in memory). When no, CSM 60 advances to a step 348 detailed below. When yes, a step 344 retrieves the respective results from register 44 and/or memory (e.g., guest state area of the VMSO of the respective guest VM). In a step 346, CSM 60 may apply the results of executing the current guest instruction. In some embodiments, step 346 comprises a set of operations carried out in conventional systems at the commit stage. For instance, step 346 may include updating values of general purpose, control, and status processor registers of the virtualized processor of the respective guest VM. In some embodiments, such registers are accessible within the guest state area of the VMSO of the respective guest VM. Step 346 may further include saving some results to memory addresses indicated by an operand of the current guest instruction. Step 346 may further include incrementing the instruction pointer (e.g., RIP in x86 platforms), to show that execution of the current guest instruction is complete.

Some embodiments of the present invention add a dedicated instruction to the current instruction set architecture (ISA) of processor 12, the new instruction instructing processor 12 to apply a result of execution of a guest instruction directly, from below the guest VM executing the respective guest instruction. The new instruction (an exemplary mnemonic is VMAPPLY) may carry out operations of step 346 (FIG. 9), e.g., copy contents from suspend event register 44 to virtual registers of the virtualized processor of the respective guest VM and/or to memory.

In some embodiments, step 346 may further verify whether the current guest instruction is an atomic instruction (e.g., as indicated by a LOCK prefix). When yes, instead of applying results directly to registers of the guest and/or to memory, step 346 may force a re-execution of the current guest instruction upon returning to guest VM (see step 356 below).

When execution results of the current guest instruction are not available (for instance, when the current VM exit was caused by a privileged instruction such as VMCALL), in a step 348, computer security module 60 determines whether disassembly data is available for the current guest instruction. When yes, in a step 350, CSM 60 may retrieve such data, for instance from disassembly field 46a of register 44 (see e.g., FIG. 6). CSM 60 may then proceed to emulate the current guest instruction according to the retrieved disassembly data (step 354).

When no disassembly data is available, a step 352 may disassemble the current guest instruction before proceeding with emulation. In a step 356, CSM 60 may re-launch the respective guest VM (e.g., by issuing a VMRESUME instruction on Intel® platforms). In some embodiments wherein step 346 includes a modification of the instruction pointer, execution of the guest process will start with the processor instruction immediately following the current guest instruction, or with a processor instruction indicated by the current guest instruction (e.g., in the case of control flow-changing instructions such as JMP, CALL, etc.).

The exemplary systems and methods described above allow a host system, such as a computer or a smartphone, to efficiently carry out computer security tasks when operating in a hardware virtualization configuration. Security tasks may include, among others, protecting the host system against malware such as computer viruses and spyware. In some embodiments, the host system is configured to execute an operating system and a set of software applications within a virtual machine. A security module may execute outside the respective virtual machine, for instance at the level of a hypervisor, and may protect the respective virtual machine against malware.

In some embodiments, the security module identifies a section of memory (e.g. a set of memory pages) containing code and/or data which is critical to the security of the protected VM, and configures access permissions for the respective section of memory. Such access permissions may indicate, for instance, that the respective section of memory is non-writable and/or non-executable. The security module may further configure the processor of the host system to generate a VM suspend event (such as a VM exit or a virtualization exception) in response to a memory access violation, e.g., when software executing within the protected VM attempts to write to a section of memory marked as non-writable, or to execute code from a section of memory marked as non-executable. The security module may then intercept such processor events via an event handler, and may determine whether such events are indicative of a computer security threat. In configurations wherein the security module executes outside the protected VM, the activity of the security module is potentially invisible to software executing within the protected VM, including malware.

In conventional systems, intercepting VM suspend events proceeds according to methods generically known in the art as "trap-and-emulate". In one example of a conventional technique, after determining which instruction caused the respective event (e.g., a VM exit), the anti-malware program emulates the respective instruction before returning execution to the protected VM, and modifies the instruction pointer to indicate that the respective instruction has already been executed. Without the emulation step, returning execution to the protected VM would typically re-trigger the VM exit, thus creating an infinite loop.

Conventional trap-and-emulate systems and methods may therefore require the anti-malware program to include an instruction disassembler and/or an instruction emulator. Such components may be complex to develop and maintain and may not be portable, for instance, from one processor to another. Moreover, in conventional systems, the disassembly and/or emulation steps are typically carried out for every VM suspend event, placing a considerable computational burden onto the host system. In contrast, some embodiments of the present invention eliminate the need for a disassembler and/or an emulator, substantially accelerating computer security operations.

Some embodiments of the present invention introduce changes to the configuration and operation of conventional processors, enabling such processors to operate more efficiently in hardware virtualization configurations. In some embodiments, the processor is configured to delay the generation of the VM suspend event until the execution phase of the pipeline for the current instruction is complete, at least in certain situations (for instance when the VM suspend event is triggered by a memory access violation). The processor may be further configured to save a result of the execution stage of the current instruction to a special processor register (distinct from the general purpose registers or control registers of the processor) or to a special memory area (e.g., a guest state area of the VMSO of the respective guest VM).

Such improvements may be especially beneficial for computer security applications, enabling an efficient protection of a virtual machine from outside, e.g., from the level of a hypervisor exposing the respective VM. When compared to a conventional computer security solution, some embodiments of the present invention allow a substantial reduction in computation, by eliminating the disassembly and emulation stages from the operation of security software configured to intercept and analyze VM suspend events. Instead of emulating the instruction which generated the respective event, some embodiments enable the security software to read the respective results from a processor register or memory location, and to apply such results directly.

In contrast to conventional systems, some embodiments of the present invention generate a VM suspend event only after the current guest instruction completes the execution stage of the pipeline. Such changes to the functionality of hardware components may introduce a delay due to extra clock ticks needed to carry out the execution stage of the respective instruction. However, such a performance penalty is substantially offset by the elimination of the instruction emulation and/or disassembly operations needed in conventional computer security software (potentially amounting to hundreds of additional instructions for each VM suspend event).

It will be clear to a skilled artisan that the above embodiments may be altered in many ways without departing from the scope of the invention. Accordingly, the scope of the invention should be determined by the following claims and their legal equivalents.

What is claimed is:

1. A host system comprising at least one hardware processor configured to execute a virtual machine and a computer security program, wherein the at least one hardware processor is further configured to:
    in response to receiving a guest instruction for execution, determine whether executing the guest instruction within the virtual machine causes a violation of a memory access permission, the guest instruction instructing the at least one hardware processor to determine a result of applying an operator to an operand, wherein executing the guest instruction in the absence of the violation causes writing the result to a first location;
    in response to determining whether executing the guest instruction causes the violation, when executing the guest instruction causes the violation, write the result to a second location distinct from the first location, the second location accessible to the computer security program; and
    in response to writing the result to the second location, switch from executing the guest instruction to executing the computer security program, wherein the computer security program is configured to determine whether the violation is indicative of a computer security threat.

2. The host system of claim 1, wherein the first location is a general purpose register of the at least one hardware processor.

3. The host system of claim 1, wherein the first location is a control register of the at least one hardware processor.

4. The host system of claim 1, wherein the first location comprises a section of a memory of the host system.

5. The host system of claim 1, wherein the result comprises a memory address.

6. The host system of claim 1, wherein the result comprises the operand.

7. The host system of claim 1, wherein the computer security program executes within the virtual machine.

8. The host system of claim 1, wherein the computer security program executes outside the virtual machine.

9. The host system of claim 1, wherein the second location comprises a predetermined register of the at least one hardware processor.

10. The host system of claim 1, wherein the second location comprises a predetermined section of a memory of the host system.

11. The host system of claim 1, wherein the second location comprises a data structure indicative of a current state of the virtual machine.

12. The host system of claim 1, wherein the at least one hardware processor is further configured, in response to switching to executing the computer security program, to read the result from the second location.

13. The host system of claim 12, wherein the at least one hardware processor is further configured, in response reading the result, to write the result to a destination determined according to the guest instruction.

14. The host system of claim 1, wherein the computer security program comprises an instruction which, when executed by the at least one hardware processor, causes the at least one hardware processor to read the result from the second location and to write the result to a destination determined according to the guest instruction.

15. The host system of claim 1, wherein the at least one hardware processor is further configured, in response to switching to executing the computer security program, to:
determine whether the guest instruction is an atomic instruction; and
in response, when the guest instruction is an atomic instruction, to execute the guest instruction within the virtual machine.

16. A method of protecting a host system from computer security threats, the method comprising:
in response to receiving a guest instruction for execution, employing at least one hardware processor of the host system to determine whether executing the guest instruction causes a violation of a memory access permission, wherein the guest instruction executes within a guest virtual machine exposed by the host system, the guest instruction instructing the at least one hardware processor to determine a result of applying an operator to an operand, wherein executing the guest instruction in the absence of the violation causes writing the result to a first location;
in response to determining whether executing the guest instruction causes the violation, when executing the guest instruction causes the violation, employing the at least one hardware processor to write the result to a second location distinct from the first location, the second location accessible to the computer security program; and
in response to writing the result to the second location, switching from executing the guest instruction to executing the computer security program, wherein the computer security program is configured to determine whether the violation is indicative of a computer security threat.

17. The method of claim 16, further comprising, in response to switching to executing the computer security program, employing the at least one hardware processor to read the result from the second location.

18. The method of claim 17, further comprising, in response to reading the result, employing the at least one hardware processor to write the result to a destination determined according to the guest instruction.

19. At least one hardware processor of a host system, the at least one hardware processor configurable to:
in response to receiving a guest instruction for execution, determine whether executing the guest instruction causes a violation of a memory access permission, wherein the guest instruction executes within a guest virtual machine exposed by the host system, the guest instruction instructing the at least one hardware processor to determine a result of applying an operator to an operand, wherein executing the guest instruction in the absence of the violation causes writing the result to a first location;
in response to determining whether executing the guest instruction causes the violation, when executing the guest instruction causes the violation, write the result to a second location distinct from the first location, the second location accessible to the computer security program; and
in response to writing the result to the second location, switch from executing the guest instruction to executing a computer security program, wherein the computer security program is configured to determine whether the violation is indicative of a computer security threat.

20. A non-transitory computer-readable medium storing instructions which, when executed by at least one hardware processor of a host system, cause the host system to form a computer security program configured to determine whether a violation of a memory access permission is indicative of a computer security threat, and wherein the at least one hardware processor is configurable to:
in response to receiving a guest instruction for execution, determine whether executing the guest instruction causes the violation, wherein the guest instruction executes within a guest virtual machine exposed by the host system, the guest instruction instructing the at least one hardware processor to determine a result of applying an operator to an operand, wherein executing the guest instruction in the absence of the violation causes writing the result to a first location;
in response to determining whether executing the guest instruction causes the violation, when executing the guest instruction causes the violation, write the result to a second location distinct from the first location, the second location accessible to the computer security program, and
in response to writing the result to the second location, switch from executing the guest instruction to executing the computer security program.

* * * * *